Sept. 17, 1963  J. K. RYE ETAL  3,103,835
FEED SCREW ARRANGEMENT FOR A MACHINE TOOL
Filed Jan. 11, 1962  4 Sheets-Sheet 4
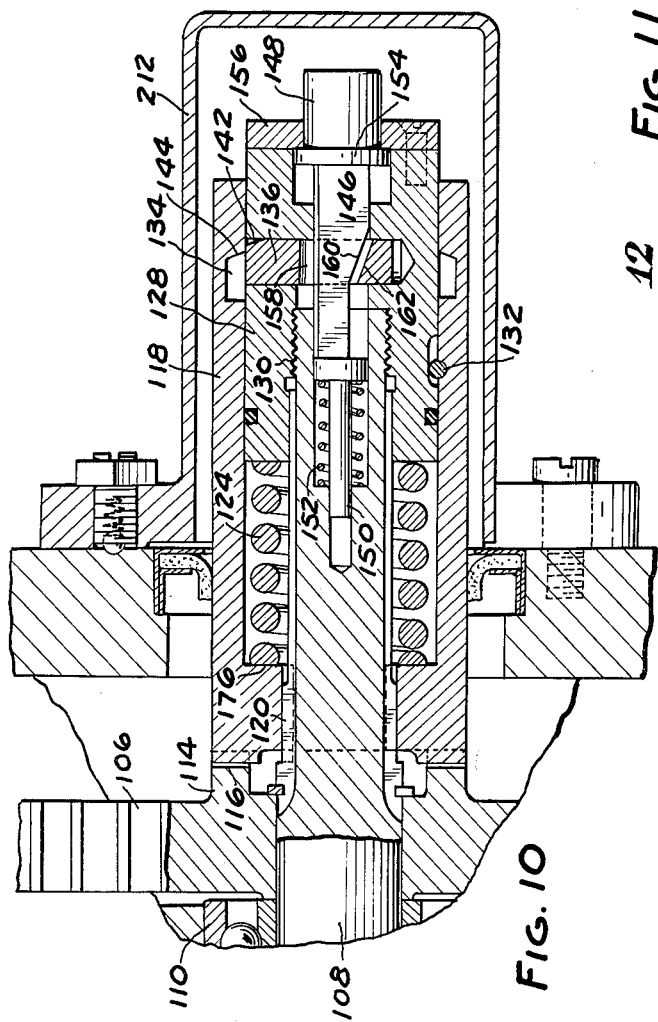
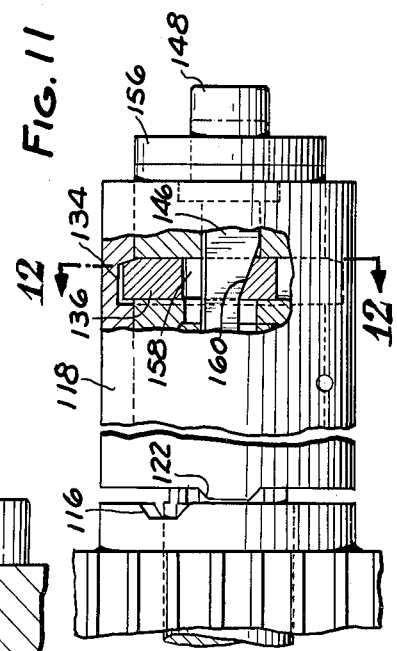
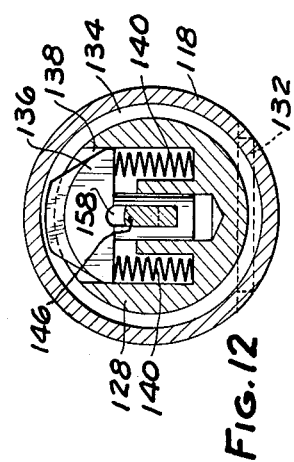
INVENTORS
JOHN K. RYE
ORVAL A. OPPERTHAUSER
& GEORGE OLTEAN
BY
ATTORNEYS ated Sept. 17, 1963

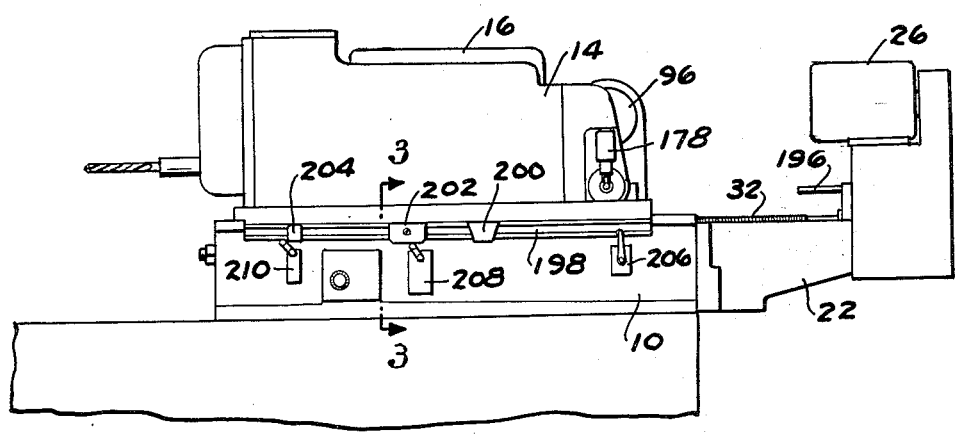
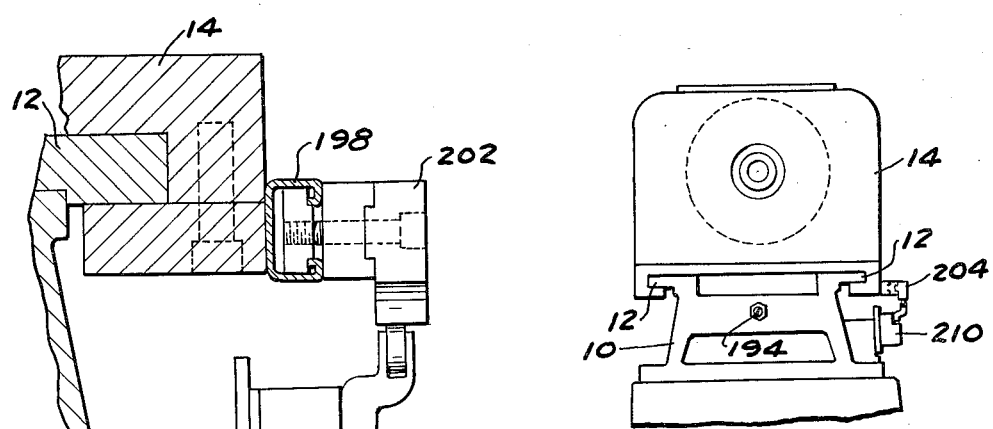
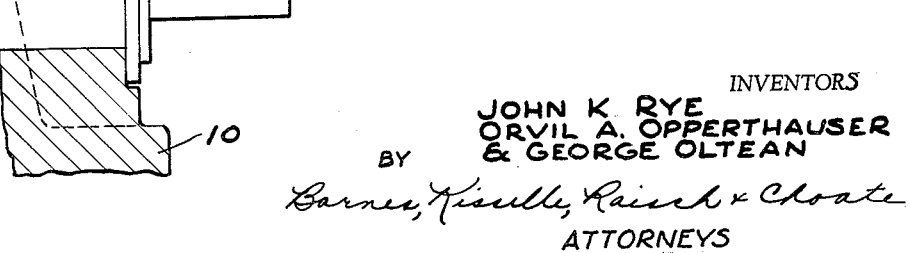

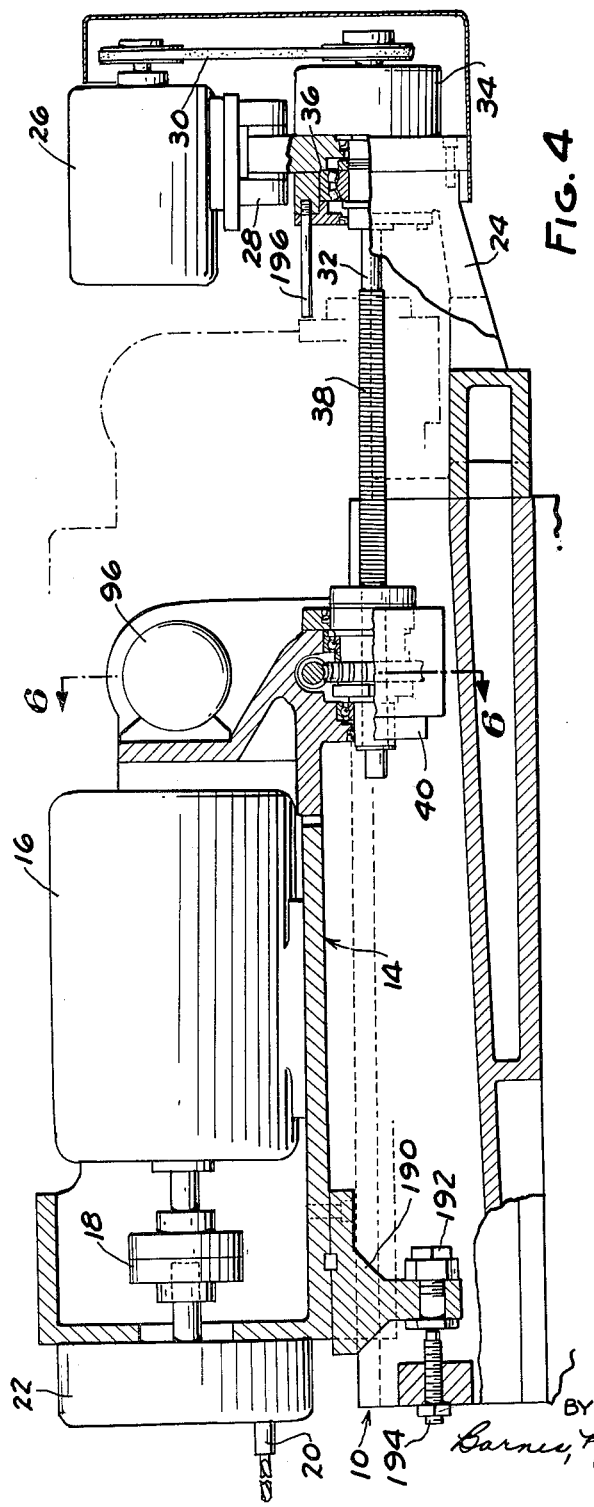
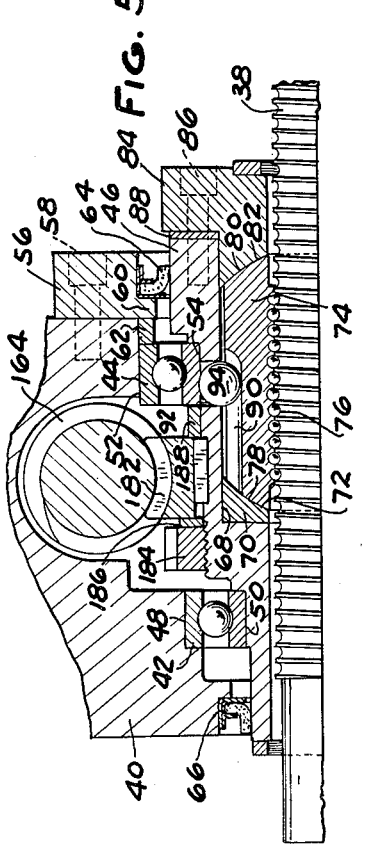

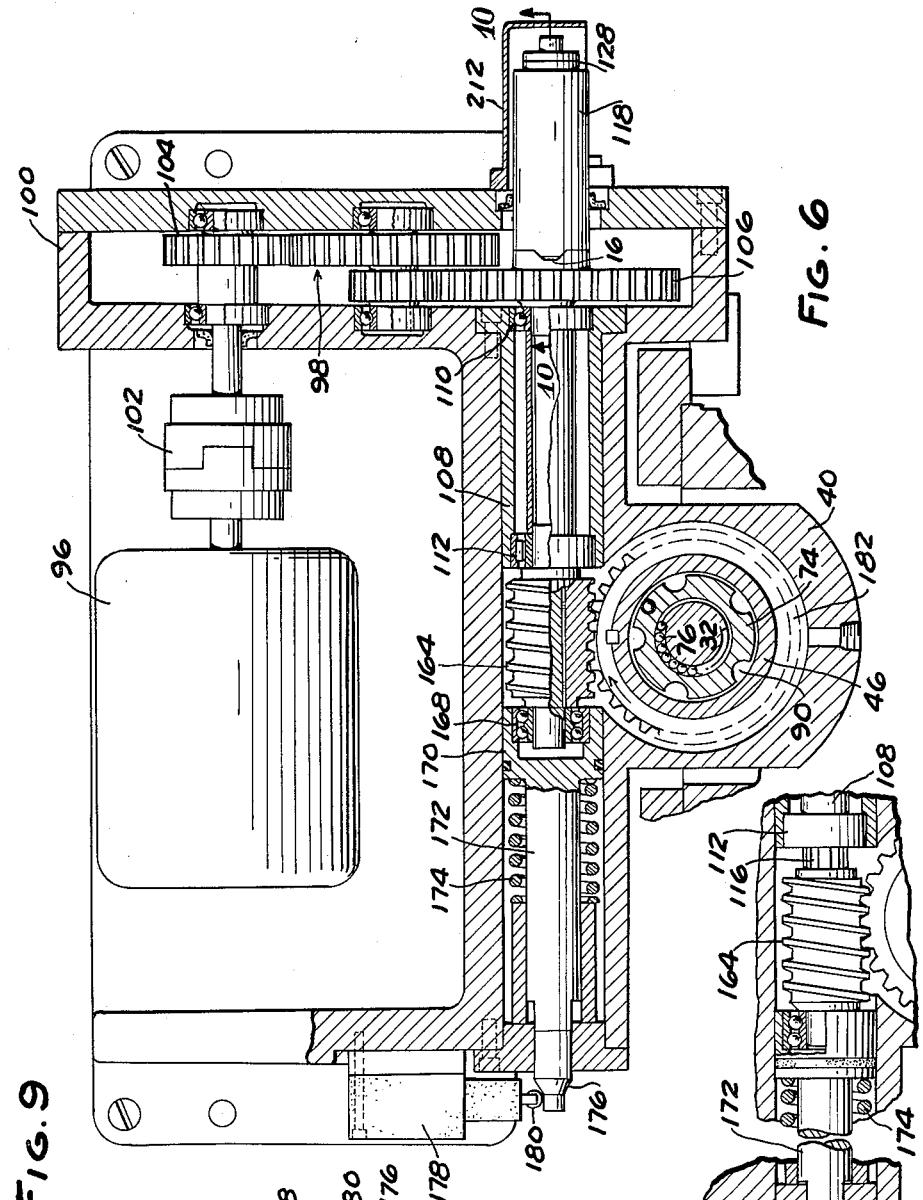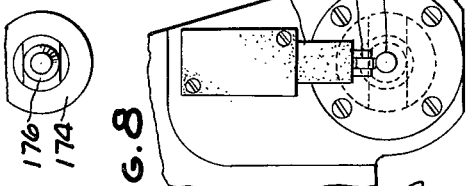

3,103,835
FEED SCREW ARRANGEMENT FOR A MACHINE TOOL
John K. Rye, Birmingham, Orval A. Opperthauser, Bloomfield Township, Oakland County, and George Oltean, Detroit, Mich., assignors to F. Jos. Lamb Company, Detroit, Mich., a corporation of Michigan
Filed Jan. 11, 1962, Ser. No. 165,627
9 Claims. (Cl. 77—32.7)

This invention relates to a machine tool of the type wherein a power-driven cutting tool is mounted on a carriage or slide that is arranged to reciprocate on the ways of the machine base so as to advance and retract the cutting tool. More particularly, the invention has to do with a feed screw mechanism for controlling the reciprocation of the carriage or slide on the base.

It is an object of this invention to provide a novel feed screw mechanism for a machine tool of the type described incorporating a novel support structure for the feed screw which eliminates the problem of alignment.

Another object of the invention is to provide a feed screw mechanism for a machine tool of the type described involving a novel means operated by the feed screw mechanism for stopping the feed motor for the carriage when the carriage engages a positive stop on the base at the end of the feed stroke of the cutting tool.

A further object of the invention resides in the provision of a feed screw mechanism for a machine tool of the type described incorporating a novel overload clutch.

In the drawings:

FIG. 1 is a side elevational view of a machine tool incorporating the present invention.

FIG. 2 is an end view of the machine tool illustrated in FIG. 1.

FIG. 3 is a fragmentary sectional view along the line 3—3 in FIG. 1.

FIG. 4 is a fragmentary side elevational view, partly in section, of the machine tool shown in FIG. 1.

FIG. 5 is a fragmentary sectional view of a portion of the machine shown in FIG. 4 on an enlarged scale.

FIG. 6 is an enlarged fragmentary sectional view along the line 6—6 in FIG. 4.

FIG. 7 is a fragmentary sectional view of the portion of the arrangement shown in FIG. 6 with the elements in a different position.

FIG. 8 is a fragmentary end view of the switch mechanism illustrated in FIG. 6.

FIG. 9 is a fragmentary end view of the switch actuating rod.

FIG. 10 is a fragmentary sectional view along the line 10—10 in FIG. 6.

FIG. 11 is a fragmentary sectional view of a portion of the structure shown in FIG. 10 with the component parts in a different position.

FIG. 12 is a sectional view along the line 12—12 in FIG. 11.

Referring to the drawings, there is shown by way of illustration a drilling machine provided with a base 10 having transversely spaced ways 12 on which a carriage or slide 14 is mounted for reciprocation. The carriage supports a motor 16 which is connected by a coupling 18 to a drill spindle 20 through a drill head gear box 22. Referring particularly to FIG. 4, base 10 has an extension 24 which supports a second motor 26 as by a motor mounting bracket 28. Motor 26 has a belt drive 30 with one end of a feed screw 32. The driven end of feed screw 32 is surrounded by a brake 34. Brake 34 is of the type that is mechanically applied as by springs and released electrically. When brake 34 is applied, it clamps the feed screw against rotation. The driven end of feed screw 32 is journalled on the frame extension 24 by means of a spherical bearing 36.

Feed screw 32 is fashioned with a helical thread 38 of semi-circular cross section which extends axially through a hollow portion 40 on carriage 14 that depends and is guided between the ways 12 on base 10. Within the hollow portion 40 of carriage 14, as is best illustrated in FIG. 5, there is journalled, as by bearings 42 and 44, a sleeve 46. The outer race of bearing 42 is mounted in an annular seat 48 on the hollow portion 40 and the inner race of this bearing is mounted on a seat 50 on sleeve 46. The outer race of bearing 44 is mounted on an annular seat 52 on the hollow portion 40 and the inner race of this bearing is mounted on an annular seat 54 on the outer surface of sleeve 46. Sleeve 46 is retained in the hollow portion 40 by an annular cap ring 56 which is held in place by screws 58. Ring 56 is provided with a shoulder 60 which engages against a spacer 62 that abuts against the outer race of bearing 44. At the opposite ends of hollow portion 40, seals 64 and 66 are provided.

Sleeve 46 has a radially enlarged cylindrical bore portion 68 at one end thereof. At the inner end of bore portion 68, there is arranged a washer 70 having a spherically shaped seat 72. A nut 74 of the ball re-circulating type is threadedly engaged with the threaded portion 38 of screw 32 through the medium of bearing balls 76. Nut 74 has an outer diameter less than the diameter of the enlarged bore portion 68 and at opposite ends thereof, nut 74 is fashioned with spherically shaped end surfaces 78, 80. The spherically shaped end face 78 is seated against the spherically shaped seat 72 of washer 70 and the spherically shaped end face 80 of the nut is engaged by a correspondingly spherically shaped seat 82 on a retaining ring 84. Ring 84 is secured to sleeve 46 by means of screws 86. A spacer or shim 88 is arranged between the end of sleeve 46 and retainer 84 so that the proper fit and clearance will be obtained between the engaged spherically shaped faces of the sleeve and nut.

Nut 74 is provided with a plurality of axially extending grooves 90 around the outer periphery thereof. Sleeve 46 is fashioned with a plurality of cylindrical sockets 92 spaced to correspond with the grooves 90. Bearing balls 94 interengage with sockets 92 and grooves 90 to form a rotary driving connection between nut 74 and sleeve 46. With this arrangement, it will be observed that it is not necessary that the screw 32 be aligned absolutely accurate with respect to the center of the hollow portion 40. The spherical bearing 36 at the drive end of the screw and the spherical support for the nut 74 at the threaded portion of the screw accommodates for any slight misalignment.

The means for rotating nut 74 so as to shift the carriage axially along the screw includes a feed motor 96 on carriage 14 (FIG. 6). A gear train 98 within a gear box 100 on carriage 14 is connected with motor 96 by a coupling 102. The input gear of the train is designated 104 and the output gear is designated 106.

Referring now to FIG. 10, output gear 106 is rotatably supported upon a shaft 108 which is in turn supported on the carriage by bearings 110 and 112, the latter of which is shown in FIG. 6. Shaft 108 extends transversely of feed screw 32. The hub portion 114 of gear 106 is fashioned with a pair of diametrically opposite cam notches 116. A sleeve 118 has a splined connection as at 120 with the end of shaft 108 adjacent gear 106. Sleeve 118 is adapted to shift axially on shaft 108 and is fashioned with a pair of cam detents 122 adapted to register and engage with the cam notches 116 on the hub portion of gear 106. Sleeve 118 is biased axially toward the hub portion 114 of gear 106 by a spring 124 which at one end abuts against a shoulder 126 within the bore of sleeve 118 and at its other end against a bushing 128 threaded on the end of shaft 108 as at 130. A pin 132 interconnects sleeve 118 with bushing 128 to prevent relative rotation therebetween. A groove 134 is formed around the inner periphery of sleeve 118 adjacent the end thereof opposite the cam detents 122. A latch 136, enclosed within a radially extending socket 138 in bushing 128, is biased in a direction radially outwardly of bushing 128 by springs 140. When cam detents 122 are engaged within the cam notches 116 on the hub of gear 106, the outer end of latch 136 is axially offset and out of registration with the groove 134 in sleeve 118. However, when the sleeve 118 is shifted axially outwardly away from gear 106, latch 136 is adapted to engage within groove 134 to hold sleeve 118 in the retracted position. It will be observed that the outer end of latch 136 and one side of groove 134 are chamfered as at 142 and 144, respectively, such that when groove 134 registers with latch 136, the chamfered faces 142, 144 interengage; and under the influence of springs 140, the sleeve 118 is retracted to a position wherein the cam detents 122 on sleeve 118 are completely disengaged from the cam notches 116 on the hub of gear 106.

Latch 136 is adapted to be retracted radially inwardly by a rod 146 which is axially slidable in bushing 128. At one end, rod 146 is provided with a re-set button 148 and at its other end, rod 146 is engaged by a plunger 150 which is biased by a spring 152 to urge the rod 146 in a direction axially outwardly of the end of bushing 128. A flange 154 on rod 146 engages the underside of a cap member 156 on the end of bushing 128 to limit the movement of rod 146 in a direction axially outwardly of bushing 128. Latch 136 is fashioned with a slot 158 through which rod 146 extends. The portion of rod 146 which extends through slot 158 is provided with a cam edge 160 which is inclined at an angle to the reciprocating axis of the rod. The adjacent edge 162 of latch 136 is correspondingly inclined. With the latch in the engaged position illustrated in FIG. 11, when re-set button 148 is depressed to shift rod 146 to the left as viewed in FIGS. 10 and 11, the cam edge 160 of rod 146 engages the inclined face 162 of latch 136 to retract the latch out of groove 134 and thereby permit sleeve 118 to shift on shaft 108 in a direction to the left so that cam detents 122 can interengage with the cam notches 116. With the above arrangement, it will be observed that gear 106 drives shaft 108 when the cam detents 122 are engaged within the cam notches 116 and the gear 106 merely free wheels on the shaft when the sleeve 118 is latched in the retracted position shown in FIG. 11.

Referring now to FIG. 6, a worm gear 164 is splined to a reduced portion 166 of shaft 108. One end of worm gear 164 abuts bearing 112 which supports shaft 108 and the other end of worm gear 164 abuts against the inner race of a bearing 168 which is slidably arranged on the end of shaft 108. The outer race of bearing 168 is seated within the enlarged end 170 of a plunger 172. Plunger 172 is biased axially toward worm gear 164 by a compression spring 174. The outer end of plunger 172 is fashioned with a conical portion 176 which, when the plunger is shifted toward the left as viewed in FIG. 6, causes actuation of a switch 178 through a cam follower 180. Switch 178, when actuated, is adapted to deenergize feed motor 96 directly. If a dwell of the cutting tool is desired at the end of the feed stroke, a timer would be used to energize motor 26 in the reverse direction to return slide 14.

Worm gear 164 meshes with a worm wheel 182 which is keyed to sleeve 46 (FIG. 5). Worm wheel 182 is retained in position on sleeve 46 by means of a nut 184 and spacers 186 and 188.

Referring to FIG. 4, the underside of carriage 14 is provided with a depending bracket 190 on which is mounted a hardened screw 192. An adjusting screw 194 at the forward end of base 10 provides a positive stop against which the screw 192 is adapted to abut to arrest movement of the carriage at the forward end of the feed stroke. As a safety measure, a back stop in the form of a rod 196 is provided for limiting the carriage travel in the retract direction in the event of failure of the hereinafter described switch 206.

In operation, at the start of a cycle, the carriage is in the retracted position shown by broken lines in FIG. 4 abutting stop 196. When the cycle start switch, not illustrated, is actuated, the spindle motor 16, the rapid advance motor 26 and the feed motor 96 are energized and brake 34 is electrically energized to release screw 32. Thus, feed screw 32 is rotated through the belt drive 30 from motor 26 in a direction to advance carriage 14 toward the left as viewed in FIG. 4. At the same time, worm gear 164 rotates worm wheel 182 so as to rotate sleeve 46. Sleeve 46 in turn drives nut 74 through the interengagement of bearing balls 94. Thus, the drive of nut 74 is superposed on the drive resulting from the rotation of feed screw 32 to advance the carriage at a rapid rate which also includes the feed rate. By having both the feed motor 96 and the rapid advance motor 26 energized during rapid advance motion of the slide 14 and their respective units driving when the rapid advance motor is de-energized and brake 34 is applied, a smooth deceleration of the moving slide from rapid advance to feed rate is obtained.

Along one side of the carriage, there is mounted a rail 198 (FIGS. 1, 2 and 3) on which are adjustably mounted cams designated 200, 202, 204. On the base 10, there is arranged three switches 206, 208 and 210. Cam 202 actuates switch 208 when the carriage 14 reaches a position just prior to interengagement of the cutting tool with the work piece. Actuation of switch 208 de-energizes rapid advance motor 26 and de-energizes and applies brake 24. Thus, rotation of screw 32 is arrested and the carriage continues to advance with a smooth movement at a feed rate determined by the worm gear drive. Eventually, screw 192 on the underside of the carriage abuts against the adjustable stop 194 to arrest further advance of the carriage. When this occurs, worm 164 continues to rotate while engaged with worm wheel 182. However, rotary movement of worm wheel 182 has been arrested and worm 164 thereby advances axially to the left on shaft 108 to compress spring 194 and actuate plunger 172. Thus, worm gear 164 now acts as a screw and worm wheel 182 as a stationary nut. As the conical nose 176 of rod 172 shifts to the left as viewed in FIG. 6, a point is reached where switch 178 is actuated. At this point, switch 210 has been actuated by cam 204 and the carriage is either caused to dwell at this forward position or to retract to the starting position. Switch 210 is a positioning switch which indicates electrically that the carriage has advanced to the forward end of its stroke. For example, if the tool should break in the work before it cut to the full desired depth, switch 178 might be actuated to stop the feed; but since switch 210 would not have been energized under such conditions, the machine will not automatically recycle and the operator would thereby be made aware of a failure in the machine operation. On the retract cycle, motor 96 is de-energized, brake 34 is released and rapid advance motor 26 is energized to rotate feed screw 32 in the reverse direction. Before the rear end of the carriage abuts against stop 196, switch 206 is actuated by cam 200 to de-energize motor 26 and to de-energize and apply brake 34.

It will be noted that since the feed screw 32 is mounted in the spherical bearing 36 adjacent its drive end and since the nut 74 is likewise mounted in a spherical bearing, it is not essential that the feed screw be absolutely aligned with the ways 12 on the base 10. It will be further observed that the arrangement of the bearing balls 94 provide a practical and economically designed drive between the self-aligning nut 74 and the worm gear and worm wheel arrangement.

It will be appreciated that spring 124 in the clutch illustrated in FIG. 10 is stronger than the spring 174 that biases worm gear 164 as shown in FIG. 6. This provides a safety feature on the machine tool so that in case of an abnormal overload, the clutch will disengage the drive to the worm gear 164 and the output gear 106 of the gear train 98 from the feed motor 96 will simply free-wheel on the drive shaft 108. As explained previously, when sleeve 118 is cammed out of engagement with the hub of clutch 106, it is engaged and retained by latch 136. After the operator has determined and corrected the cause of the abnormal overload, to re-establish the drive between the gear train 98 and shaft 108, he merely removes cover 212 and depresses reset button 148. The cam surface 160 on rod 146 engages the cam surface 162 on latch 136 to retract the latch from the groove 134 on sleeve 118 and the sleeve is shifted into engagement with the cam notches on the hub of gear 106 under the influence of spring 124.

We claim:

1. In a machine tool of the type comprising a base, a carriage reciprocable on the base to feed and retract a cutting tool mounted on the carriage, the combination comprising a feed screw on the base, a motor for driving the feed screw, a motor driven worm gear on the carriage, a sleeve rotatably supported on the carriage in generally concentric relation with the axis of the feed screw, a worm wheel mounted on the sleeve to rotate the latter and meshing with the worm gear, said sleeve having a generally spherical bearing seat concentric with the axis of the shaft, a nut engaged with said feed screw and having an outer surface portion seated in said spherical bearing seat in the sleeve, a plurality of spline grooves on the outer surface of the nut, said sleeve having a plurality of sockets therein registering with said spline grooves on the nut and a bearing ball in each groove projecting into the corresponding socket on the sleeve with a close fit.

2. In a machine tool of the type comprising a base, a carriage reciprocable on the base to feed and retract a cutting tool mounted on the carriage, the combination comprising a feed screw journalled on said base adjacent one end thereof, a motor on said base having a driving connection with said end of the screw, said carriage having a hollow portion through which the feed screw extends, a sleeve surrounding said feed screw and journalled for rotation in said hollow portion of the carriage, said sleeve having a spherical bearing seat internally thereof, a nut seated in said spherical bearing seat and threaded on said feed screw, a rotating driving connection between the sleeve and the nut, a worm wheel keyed to said sleeve and a motor driven worm gear on the carriage meshing with the worm wheel said driving connection between the nut and sleeve comprising a plurality of axially extending grooves around the nut, a plurality of sockets around the sleeve registering with said grooves and bearing balls in said grooves projecting into said socket with a close fit.

3. In a machine tool of the type including a base, a carriage reciprocable on the base to feed and retract a cutting tool mounted on the carriage, the combination comprising a feed screw on the base, a nut journalled on said carriage and threaded on said feed screw, means on said carriage for rotating said nut comprising a motor, a shaft for driving the nut, a gear train driven by said motor, the output gear of said train having a hub provided with fixed, axially projecting rotary cam means thereon, a sleeve having a rotary driving connection with said shaft and axially slidable relative thereto, said sleeve having fixed, axially projecting cam means thereon engageable with the cam means on the hub of the output gear to establish a driving connection between the output gear and said shaft and means biasing said sleeve axially to interengage said cams, said cams being shaped to shift the sleeve axially in opposition to said biasing means when the torque tending to resist rotation of the nut exceeds a predetermined value.

4. The combination set forth in claim 3 wherein said output gear is rotatably supported on said shaft and said sleeve is telescoped over and keyed to said shaft.

5. In a machine tool of the type including a base, a carriage reciprocable on the base to feed and retract a cutting tool mounted on the carriage, the combination comprising a feed screw on the base, a nut journalled on said carriage and threaded on said feed screw, means on said carriage for rotating said nut comprising a motor, a shaft for driving the nut, a gear train driven by said motor, the output gear of said train having a rotary cam thereon, drive means having a rotary driving connection with said shaft and axially slidable relative thereto, said drive means having a cam thereon engageable with the rotary cam on the output gear to establish a driving connection between the output gear and said shaft and means biasing said driving means axially to interengage said cams, said cam being shaped to shift the drive means axially in opposition to said biasing means when the torque tending to resist rotation of the nut exceeds a predetermined value, and latch means for engaging and retaining said drive means in said axially shifted position.

6. The combination set forth in claim 5 wherein said latch means includes a cam portion effective to shift said drive means axially sufficient to completely disengage said cams when the cams shift the driving means axially to a position wherein the drive means is engaged by said latch.

7. In a machine tool of the type including a base, a carriage reciprocable on the base to feed and retract a cutting tool mounted on the carriage, the combination comprising a feed screw on the base, a nut journalled on said carriage and threaded on said feed screw, means on said carriage for rotating said nut comprising a motor, a shaft for driving the nut, a gear train driven by said motor, the output gear of said gear train having a rotary cam thereon, drive means having a rotary driving connection with said shaft and axially slidable relative thereto, said drive means having a cam thereon engageable with the rotary cam on the output gear to establish a driving connection between the output gear and said shaft and means biasing said driving means axially to interengage said cams, said cams being shaped to shift the drive means axially in opposition to said biasing means when the torque tending to resist rotation of the nut exceeds a predetermined value, said output gear being rotatably supported on said shaft and said driving means comprising a sleeve keyed to said shaft, said sleeve having a circumferentially extending groove thereon, said shaft having a radially shiftable latch thereon which is biased to shift radially outwardly of the shaft, said latch and groove being in registering relation when the sleeve is shifted axially by said cams in opposition to said biasing means.

8. The combination set forth in claim 7 wherein said latch and groove have cooperating cam surfaces adapted to shift the sleeve axially to a position wherein the cams are spaced completely out of engagement when the latch engages with said groove.

9. The combination set forth in claim 7 including an axially shiftable actuator on said shaft for retaining the latch in a radially inwardly shifted position out of engagement with said groove.

References Cited in the file of this patent

UNITED STATES PATENTS

| 2,030,007 | Kingsbury | Feb. 4, 1936 |
| 2,240,795 | Morgan et al. | May 6, 1941 |
| 2,562,170 | Busemeyer | July 31, 1951 |
| 2,781,616 | Estabrook | Feb. 19, 1957 |

FOREIGN PATENTS

| 443,756 | France | Oct. 2, 1912 |
| 392,720 | Great Britain | May 25, 1933 |